United States Patent [19]
Mathisen

[11] Patent Number: 5,930,740
[45] Date of Patent: Jul. 27, 1999

[54] CAMERA/LENS CALIBRATION APPARATUS AND METHOD

[75] Inventor: Allen E. Mathisen, Sandy, Utah

[73] Assignee: Evans & Sutherland Computer Corporation, Salt Lake City, Utah

[21] Appl. No.: 08/835,120

[22] Filed: Apr. 4, 1997

[51] Int. Cl.$^6$ .................................................... H04N 5/00
[52] U.S. Cl. ........................................... 702/152; 702/153
[58] Field of Search ....................... 702/92–95, 150–155; 396/128; 348/349, 350

[56] References Cited

U.S. PATENT DOCUMENTS

| | | | |
|---|---|---|---|
| 4,609,939 | 9/1986 | Kozawa et al. | 356/121 |
| 5,059,019 | 10/1991 | McCullough | 352/131 |
| 5,502,482 | 3/1996 | Graham | 348/140 |

OTHER PUBLICATIONS

Leonardo Chiariglione, Signal Processing Image Communication, A Differential Method for Simultaneous Estimation of Rotation, Change of Scale and Translation pp. 69–80, May 1990.

Goshtasby, Ardeshir, vol. 26, No. 1, Jan. 1988, Registration of Images with Geometric Distortions, pp. 60–64.

*Primary Examiner*—John Barlow
*Assistant Examiner*—Craig Steven Miller
*Attorney, Agent, or Firm*—Thorpe, North & Western, L.L.P.

[57] ABSTRACT

A method and apparatus for generating a viewport definition for a computer generated image using sensor information relating to a video camera's pan, tilt, zoom, and focus controls. The method generally comprises the steps of: (a) establishing reference points within an enclosed space which is to be used for recording images with the camera; (b) positioning the camera within the enclosed space relative to the reference points such that the camera position can be determined through triangulation with respect to the reference points; (c) developing position data through triangulation which identifies the camera position in a coordinate system relative to the reference points; (d) recording camera orientation data from sensors disposed to detect camera parameters defining the camera's pan, tilt, zoom, and focus settings; and (e) developing a database defining a viewport for the camera defined from a combination of the position data and the camera orientation data. Calculating the viewport (i.e., a nodal point or eyepoint, an orientation, a field of view, a focal plane distance, and a focus of expansion) as the camera moves is the ultimate goal of the camera tracking device.

31 Claims, 14 Drawing Sheets

CAMERA/LENS CALIBRATION APPARATUS AND METHOD

BACKGROUND OF THE INVENTION

1. The Field of the Invention

This invention relates generally to generating images for a virtual set, and more particularly to a method and apparatus by which an entire viewport definition for a computer generated image is computed from a camera's pan, tilt, zoom, and focus sensor information.

2. The Background Art

Calculating virtual sets is known in the art of computer generated imaging. A virtual set combines scenes viewed and recorded by a camera with scene elements (such as backdrops) from some other source. The scenes recorded by the camera are typically either moving or stationary objects and the scenes are photographed in front of a plain, colored wall; typically, the wall being colored blue or green. Special equipment or processes are then used to combine the camera scenes with the other scene elements. The combination is usually accomplished using compositing techniques.

For example, a typical application of compositing techniques involves combining a camera scene with a background scene, wherein the camera scene is a live person in the foreground and the background scene is a photograph of some other scene (a "synthetic scene"). Using these techniques, everything in the camera scene which is the color of the studio backdrop (e.g., blue) is replaced with the synthetic scene. Preferably, the combined image will then appear as though the person is located in the background scene.

Rather than just placing the camera scene in front of the background scene (but clearly not blending into the background scene), often it is desirable to make the camera scene appear as if it was actually part of the background scene. In such cases, it is necessary to know, with considerable precision, enough information about the camera to generate the scene that the camera is "seeing" if the background scene were really part of the camera's environment. These calculations require that the image generator know what a camera is "seeing" so that the image generator can create the corresponding scene from a virtual database. The required camera information includes knowing the XYZ position, the orientation (pan, tilt, and roll), field of view (zoom), and focus.

Precise calculations of the camera information has been a problem for years. Some systems involve setting up cameras using a tape measure to measure distances for each position of the camera. For example, if the camera is on a pedestal, measuring the location of the pedestal can be useful information when determining camera position. Then, rather than calculating the angular position of the camera, the camera scene is manually matched, by observation, with the synthetic scene. These calculations introduce other problems because they may not take into account nodal point offset from the pan/tilt axis origin which results in registration errors in a composite image. Additionally, the calculations may simply not allow any nodal point offset from the pan/tilt axis intersection. The result is that the center of gravity is put off of the tilt axis, causing motors to burn power while dynamically holding the camera in position. In addition, even if nodal position may be accurately computed, the calculation may be accurate for only one field of view.

As appreciated by those skilled in the art, the available calibration techniques are very tedious, often requiring measurements using an optical workbench and data points recorded manually. In fact, some techniques for properly moving a camera on a virtual set require up to 45 minutes for each camera move. When cameras are moved multiple times during the day on the virtual set, considerable time is lost and the importance of more rapidly calibrating the necessary virtual set data is appreciated. Of current interest is a method and apparatus for more rapidly computing an entire viewport definition for the calculation and generation of virtual images.

OBJECTS AND SUMMARY OF THE INVENTION

It is an object of the present invention to provide a method and apparatus for quickly computing a viewport definition so that virtual images can be generated without unreasonable delay.

It is another object of the invention to provide such a method and apparatus for quickly computing an eyepoint of a camera so that a virtual set can be generated without undue delay.

It is still another object of the invention to provide such a method and apparatus for rapidly computing an orientation of a camera so that a virtual set can be generated without undue delay.

It is also an object of the invention to provide such a method and apparatus for computing a field of view of a camera using only mechanical sensors for the pan, tilt, zoom, and focus settings and controls of the camera.

It is an additional object of the invention to provide such a method and apparatus for computing a focal plane distance of a camera so that a virtual set can be generated without undue delay.

It is yet another object of the invention to provide such a method and apparatus for computing a focus of expansion of a camera so that a virtual set can be generated without undue delay.

It is a further object of the invention to provide such a method and apparatus for constraining certain kinds of movement of the camera whereby the desired viewport may be calculated quickly while using minimal parameters and minimal equipment.

The above objects and others not specifically recited are realized through a method and apparatus for generating a viewport for a computer generated image using sensor information relating to a video camera's pan, tilt, zoom, and focus controls. The method generally comprises the steps of: (a) establishing reference points within an enclosed space which is to be used for recording images with the camera; (b) positioning the camera within the enclosed space relative to the reference points such that the camera position can be determined through triangulation with respect to the reference points; (c) developing position data through triangulation which identifies the camera position in a coordinate system relative to the reference points; (d) recording camera orientation data from sensors (typically optical encoders) disposed to detect camera parameters defining the camera's pan, tilt, zoom, and focus settings; and (e) developing a database defining a viewport for the camera defined from a combination of the position data and the camera orientation data. Calculating the viewport (i.e., an eyepoint, an orientation, a field of view, a focal plane distance, and a focus of expansion) as the camera moves is the ultimate goal of the camera tracking device.

It is an advantage of the present invention to provide a method and apparatus that quickly computes a viewport definition so that virtual images can be generated without unreasonable delay. It is not uncommon in the prior art to take 45 minutes to recalculate a viewport definition when the camera is moved. This delay is significantly overcome by the present invention.

It is another advantage of the invention to provide such a method and apparatus for quickly computing an eyepoint or field of view of a camera so that a virtual set can be generated without undue delay. Similar to computing a viewport definition, the present invention advantageously calculates an eyepoint definition or a field of view without the delays experienced by the prior art.

It is a further advantage of the present invention to provide such a method and apparatus for constraining certain kinds of movement of the camera whereby the desired viewport may be calculated using minimal parameters and minimal equipment.

It is still another advantage of the present invention to utilize pan, tilt, zoom, and focus sensors for pedestal positioning.

Additional objects and advantages of the invention will be set forth in the description which follows, and in part will be apparent from the description, or may be learned by the practice of the present invention. The objects and advantages of the invention may be realized and obtained by means of the instruments and combinations particularly pointed out in the appended claims.

BRIEF DESCRIPTION OF THE DRAWINGS

The above and other objects, features, and advantages of the invention will become apparent from a consideration of the following detailed description presented in connection with the accompanying drawings in which.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the appended claims.

A principle of the present invention is to use a camera itself, rather than a transit or theodolite, to calculate the camera position through the surveying method of triangulation. Triangulation is a trigonometric method for finding a position using bearings from two "fixed" points that are a known distance apart. When the camera acts as the theodolite, the camera can be used to calculate its own position relative to a set of reference marks in the studio. After the camera position is determined, the position information is combined with other camera information so that a complete image generator viewport for the virtual set may be defined.

The first step in the present invention is to establish the "fixed" points or reference points for the triangulation calculations that are to be calculated while using the camera as a theodolite. The reference points are typically established within an enclosed space such as a television studio where foreground scenes can be easily videographed with the typical blue or green background in preparation for compositing with a virtual image. A preferred layout of the reference points is shown in FIG. 1.

Figure 1:
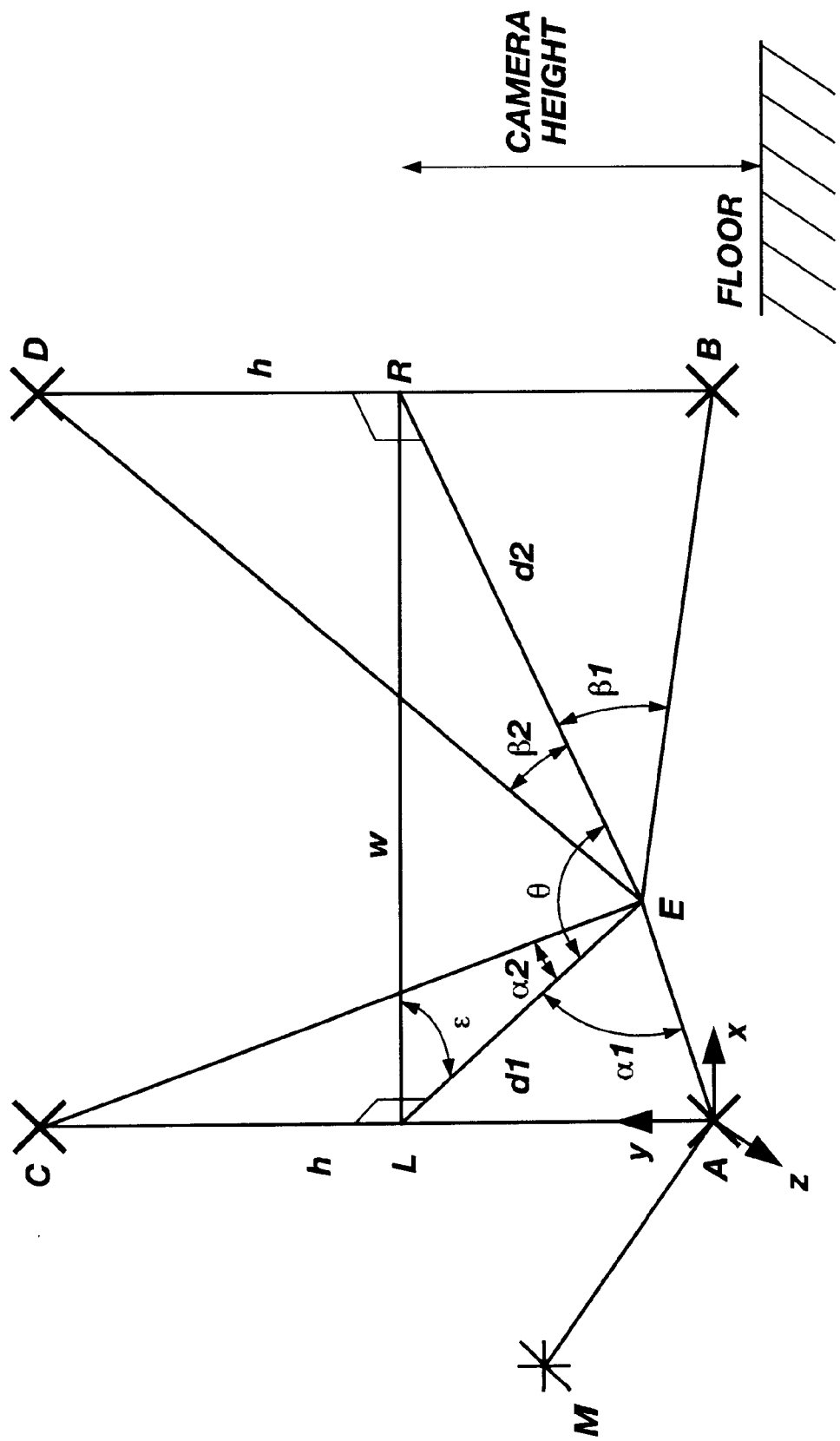
FIG. 1 shows a front view of reference points A, B, C, and D as viewed from an eyepoint E.
Figure 1A:
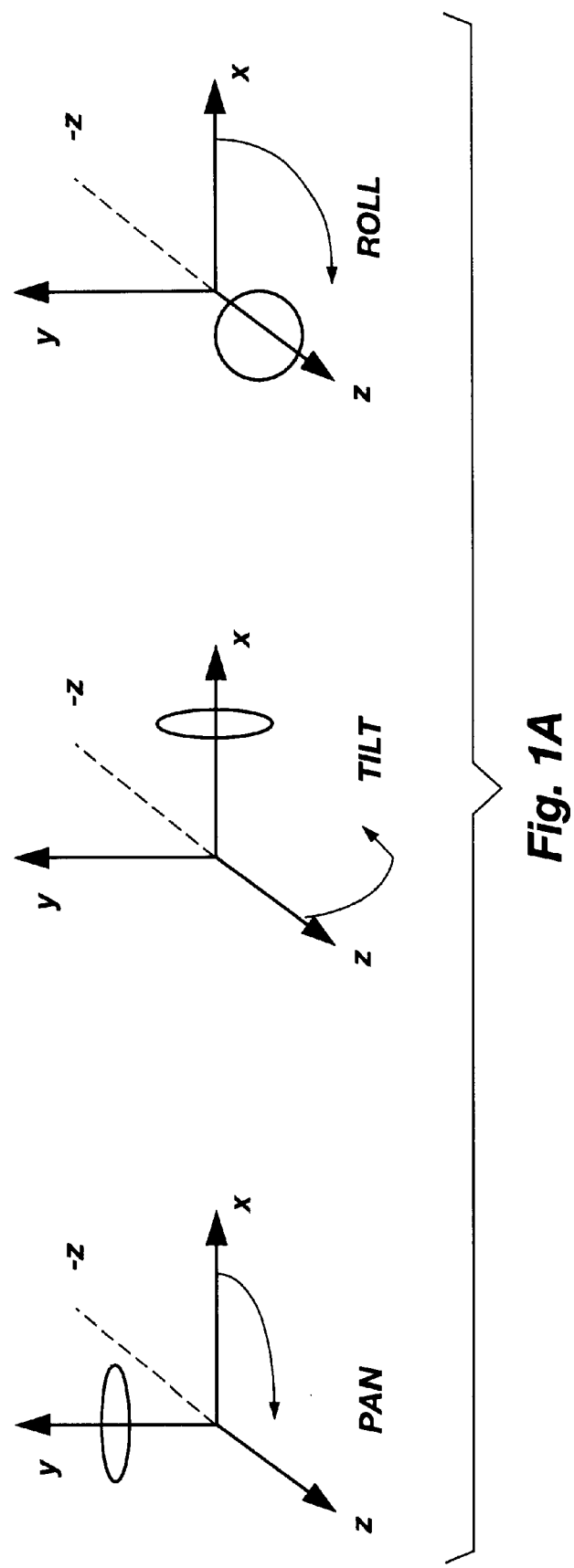
FIG. 1A illustrates the coordinate system that is used in the present invention for the calculations of a viewport definition.

In FIG. 1, reference points A, B, C, and D form a rectangle in a plane, the plane preferrably being the wall of the studio. The rectangle is formed when vertical lines AC and BD are established in parallel with height h. Reference points A and B are each at the same elevation, as are reference points C and D. The distance between the two lines is labeled w. A right hand coordinate system is established in x, y, and z to simplify understanding the orientation between these reference points and other points to be introduced. The coordinate system is shown at the bottom left portion of FIG. 1 and the details of the coordinate system are shown in FIG. 1A. The line from A to B is parallel with the x axis of studio space in the coordinate system while the line from A to C is parallel with the y axis. The z axis is perpendicular to the x, y plane and faces toward the viewer or eyepoint, E. Eyepoint E is also known as the nodal point.

A horizontal plane is formed between the nodal point, E, and the two points labeled L and R. The points L and R are the points where the horizontal plane, ELR, intersects the lines AC and BD. The ELR plane is perpendicular with the ABCD plane, thus, line EL is perpendicular to AC and line ER is perpendicular to BD. The LR line varies in its height depending on the current height of the eyepoint E, the eyepoint corresponding with the height and other parameters of the camera.

The point M represents model space. The offset between model space and the studio reference space can be adjusted by the user. The studio space can be rotated in azimuth and translated relative to model space to choose optimum camera views of the virtual environment. Database units and model space to studio reference space offset (MA vector) may differ between databases as may studio space versus model space heading orientation. However, in accordance with the present invention, the parameters are quickly and easily changed.

Establishing the reference points A, B, C, and D can be accomplished in various manners. One method is to obtain a plumb bob, a ladder, a measuring tape, and markers (e.g., thumbtacks). This method will take approximately two hours to complete. To begin, you should plan approximate locations for the reference points. Although spacing is not critical, the more widely the markers are spaced, the better accuracy will be achieved during calibration. With the plumb bob, drop a vertical line that will lie along AC at a convenient place at the left of the studio. Drop the line at a place that can be seen by the camera for all anticipated camera positions. A wall is often a good choice because walls have an almost vertical, planar surface and a place to put a mark without requiring additional supporting structures.

If the markers are thumbtacks, press a thumbtack into the wall at an arbitrary point C near the top of the plumb line. Keep the head of the thumbtack just touching and centered on the plumb line. Next, press a thumbtack into the wall at an arbitrary point A near the bottom of the plumb line. The head of the thumbtack should be centered and slightly touching the plumb line. You may have to adjust how deeply the thumbtacks are pressed into the wall to keep their heads plumb. You may have to add a shim beneath one of the thumbtacks if the wall is sufficiently out of plumb. The distance between points A and C should be measured and the distance, h, should be recorded.

Next, with the plumb bob, drop a vertical line that will lie along BD at a convenient place at the right of the studio. Typically, this will be the same wall that is used while marking points A and C. Press a thumbtack into the wall at point B near the bottom of the plumb line, the distance from the floor being the same distance from the floor as point A. Measure upward from point B along the plumb line a height h and place another thumbtack at point D. The floor may be slightly off level, so an adjustment in the vertical line BD may be necessary. Measure the diagonal distances between BC and AD. Adjust points B and D along the plumb line as necessary until diagonal distances BC and AD match, keeping the distance between B and D equal to h. Finally, measure width w, the distance between points A and B. Record w for future reference.

Figure 2:
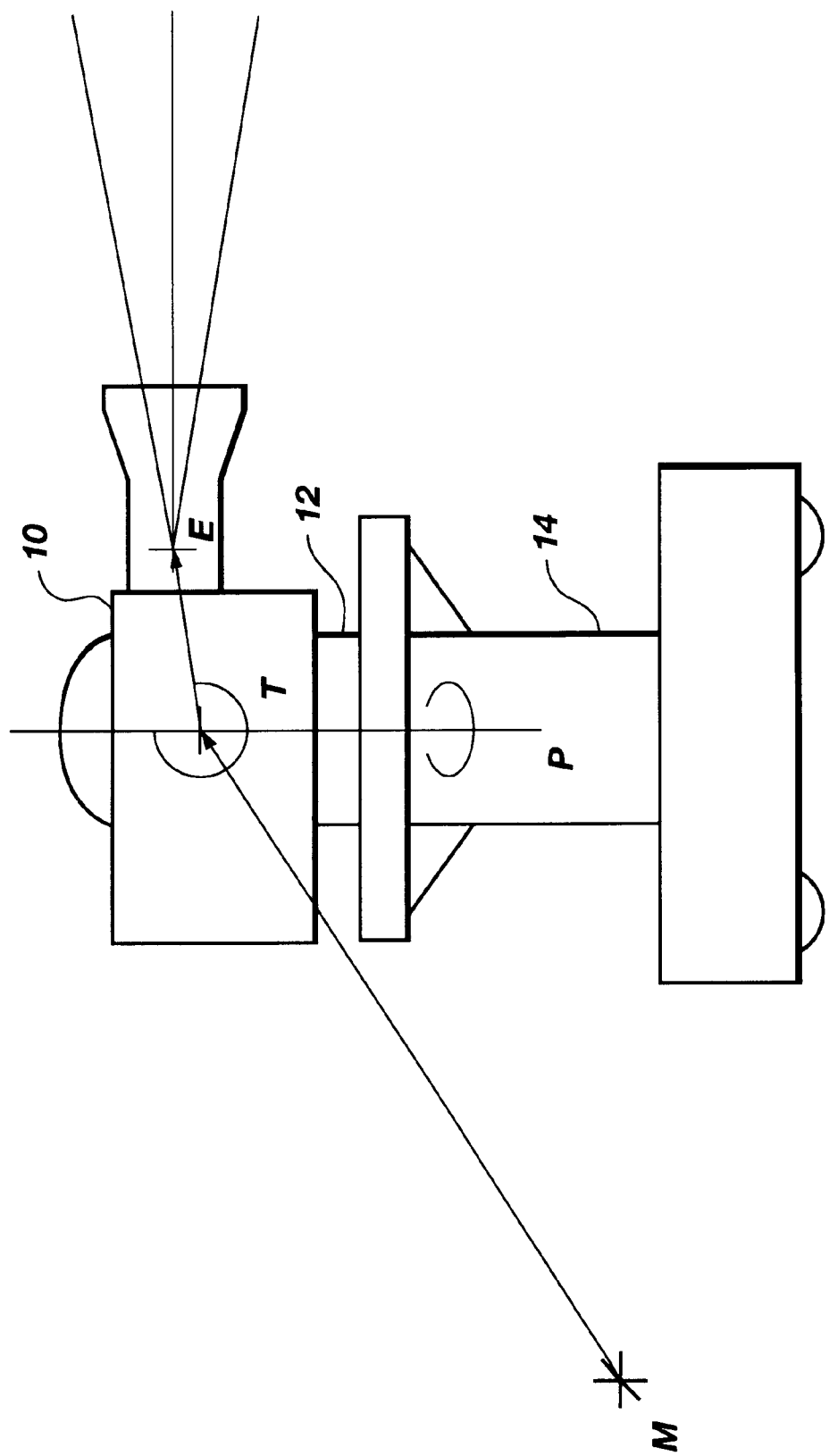
FIG. 2 illustrates a side view of a camera mounted on a pedestal with indications of the location of points of interest in viewport calculations.

Once reference points are established in the studio, a camera must be positioned within the studio such that the reference points are within the field of view of the camera. FIG. 2 shows the camera 10 positioned on a head 12 of a pedestal 14. The camera 10 is positioned such that the camera has only pan and tilt movement; camera roll is prevented. FIG. 1A shows the movements that correspond with camera pan, tilt, and roll. Pan is a counter clockwise angle (looking toward positive y) of movement of the camera 10 on the y axis in the x-z plane, tilt is a clockwise angle (looking toward positive x) of movement of the camera on the x axis in the y-z plane, and roll is a counter clockwise angle (looking toward positive z) of movement of the camera on the z axis in the x-y plane. Hereinafter and in accordance with common practice in the art, the symbols for pan, tilt, and roll will be h, p, and r, respectively.

Camera 10 pan and tilt angles are tracked by sensors within the head 12. As shown in FIG. 2, various points of interest are indicated by different symbols; M represents model space, T represents the point of intersection between pan and tilt axes, P represents the pan axis, and E represents the eyepoint (or nodal point) and should move in the plane of the pan axis perpendicular to the tilt axis. Cross hairs or other center-indicator must appear in the camera 10 viewfinder or in an auxiliary monitor. It should be noted that the eyepoint is usually offset from the camera's center of gravity.

Figure 3:
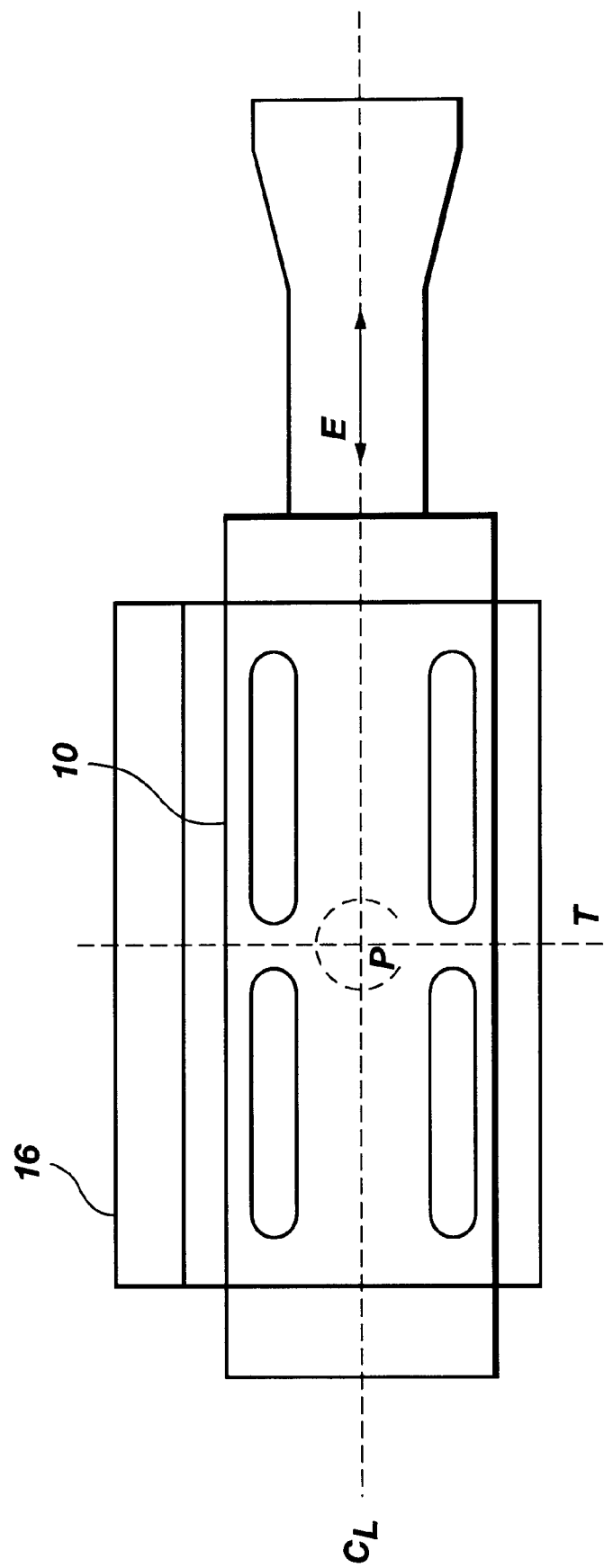
FIG. 3 shows a top view of a camera mounted on a head such that the lateral centering of the camera may be appreciated.
Figure 4:
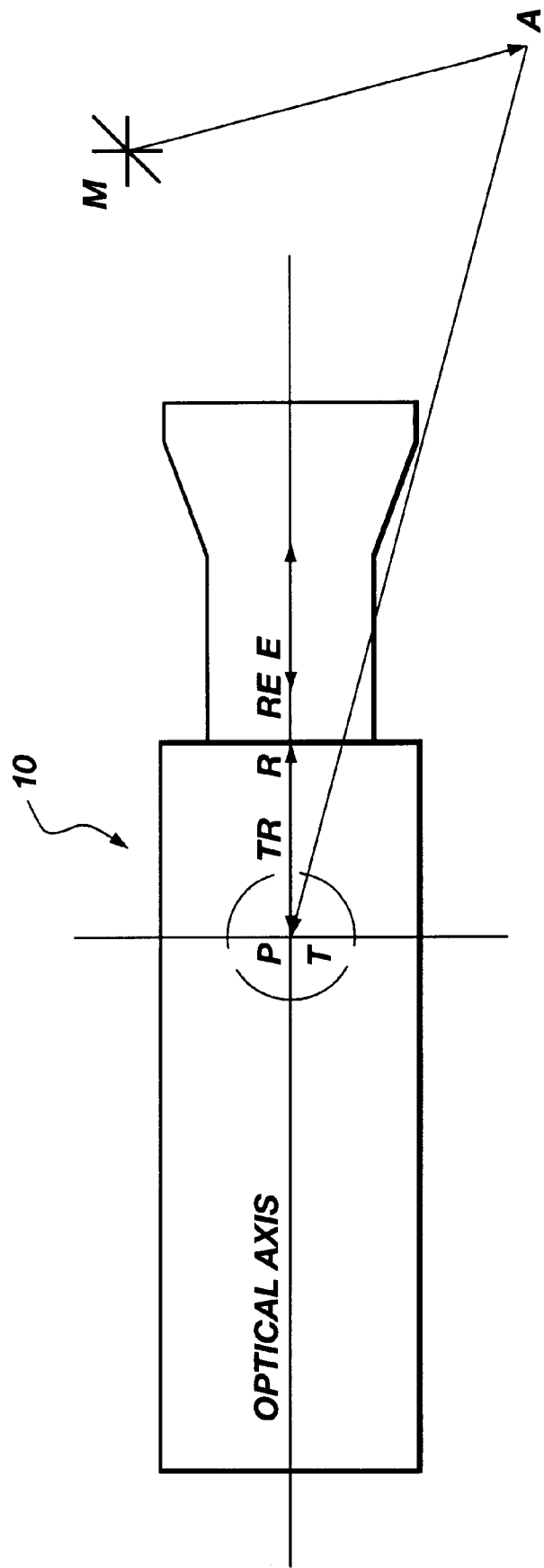
FIG. 4 illustrates a top view of a camera so that the nodal point can be seen as being offset from the tilt axis.

FIG. 3 shows a top view of the camera 10 such that lateral centering of the camera may be viewed in regard to mounting the camera to head 12 of the pedestal 14. As shown in FIG. 3, the camera 10 is mounted so as to be laterally centered on the head 12. It is also desirable to move the camera 10 forward or backward to put the center of gravity near the tilt axis. As a result, the nodal point E will usually be offset from the tilt axis as shown in FIG. 4. You may want to mark the position of the camera 10 on the head 12 in case you ever need to remove and remount the camera.

Figure 4A:
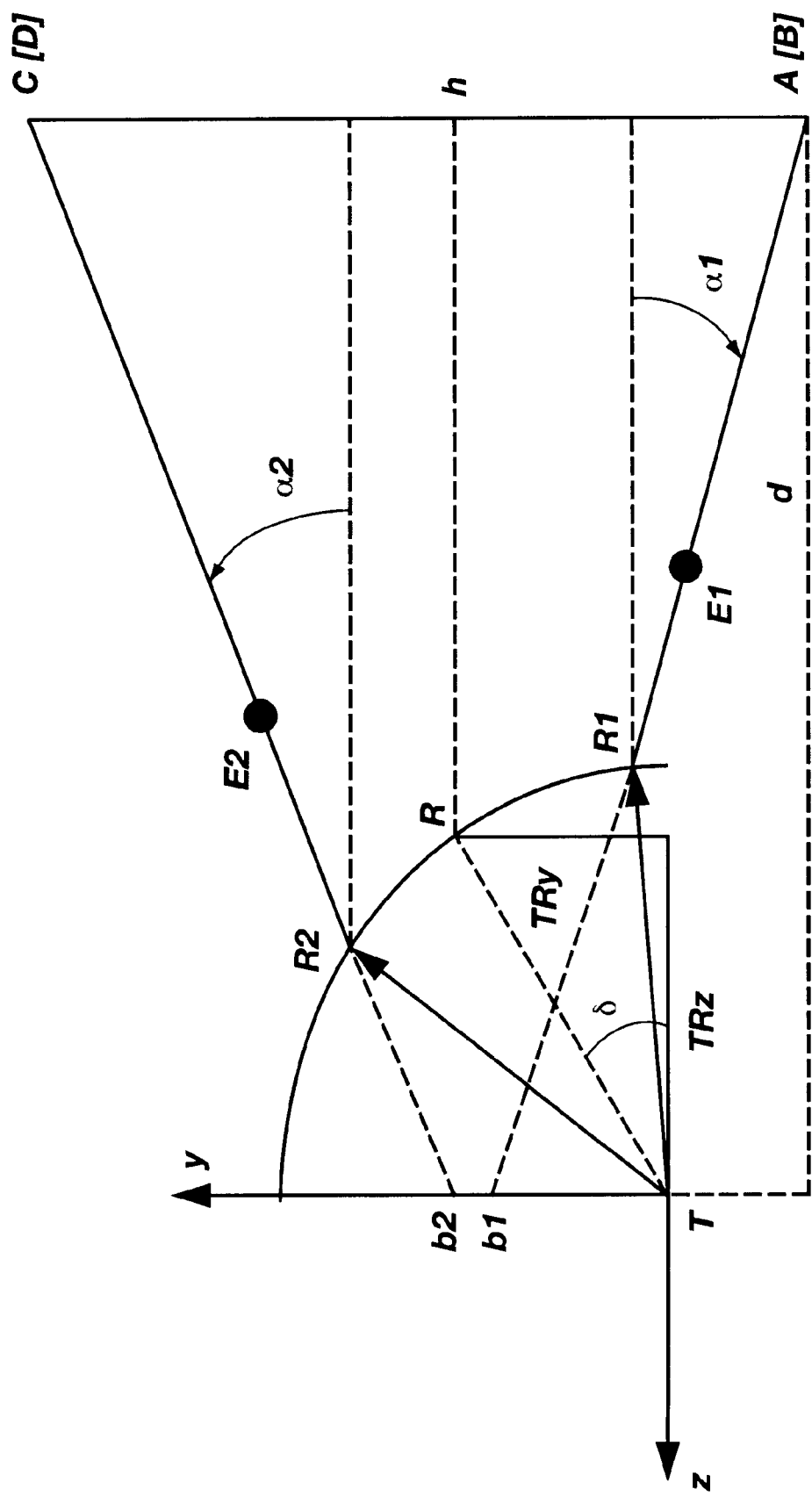
FIG. 4A shows a side view of vector TR and the vectors used to calculate distance d.

FIG. 4A shows a side view of the rays along the optical axis and their associated tilt angles when viewing points A[B] or C[D]. T is the tilt axis and d is the distance between T and AC. R is a reference point on the camera where the optical axis meets the front of the camera body. These vector components TRy and TRz are measured and recorded for future use in calculating r, the length of vector TR, and angle δ between the horizontal plane and the TR vector.

Another important mounting aspect is leveling the camera 10 on head 12. The camera 10 must be accurately leveled for proper camera tracking when using mechanical pan, tilt, zoom, and focus sensors. Leveling the head permits the simple assignment of camera pan and tilt to heading and pitch in the virtual environment. Usually, the floor of a studio is not perfectly flat or horizontal. Thus, the camera level should be checked and corrected if necessary whenever the camera is moved from one location to another. The pan axis of the camera head should be vertical to within one minute of arc for best results at television resolution for wide and narrow shots.

Figure 5:
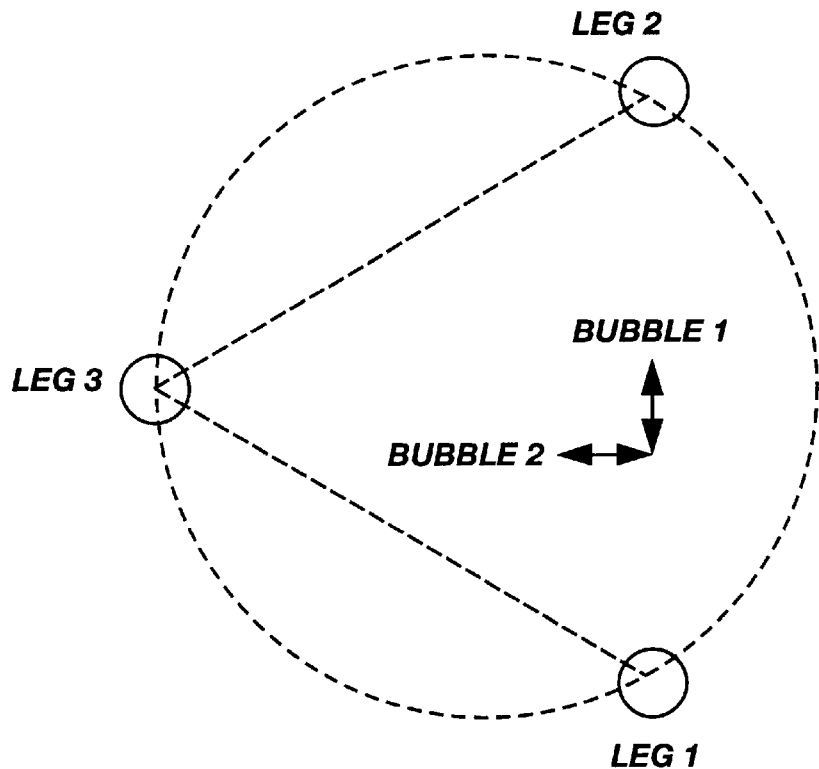
FIG. 5 shows a top view of a tripod head equipped with tubular bubbles at 90 degrees.

Proper leveling occurs by visually setting the head 12 to be approximately level. This can be accomplished through use of head 12 level indicators that are often built into the head. If the head is mounted on a tripod, adjust the leg spreader or extension to adjust the leveling of the camera head. FIG. 5 shows a camera head with two tubular bubble level indicators arranged at 90 degrees with respect to each other. The head is oriented on a tripod so that the axis of Bubble 1 is approximately parallel to an imaginary line through Leg 1 and Leg 2 pivots, and the axis of Bubble 2 is parallel to an imaginary line through Leg 3 perpendicular to Bubble 1. To level the head, (1) adjust Leg 1 (and Leg 2 if necessary) until Bubble 1 is centered; (2) adjust Leg 3 until Bubble 2 is centered (note that Bubble 1 is relatively insensitive to changes in Leg 3); and (3) repeat steps 1 and 2 if necessary until the desired leveling is accomplished.

If the bubble level indicators are not sufficiently accurate, the level of head 12 may be fine tuned using the reference points in the studio (A, B, C, and D, established in reference to FIG. 1). The fine tuning begins with the above steps of leveling the camera head as accurately as possible. Then, zoom in the camera, set focus to infinity, and unlock the tilt and pan. The camera is now ready for fine tune leveling.

Figure 5A:
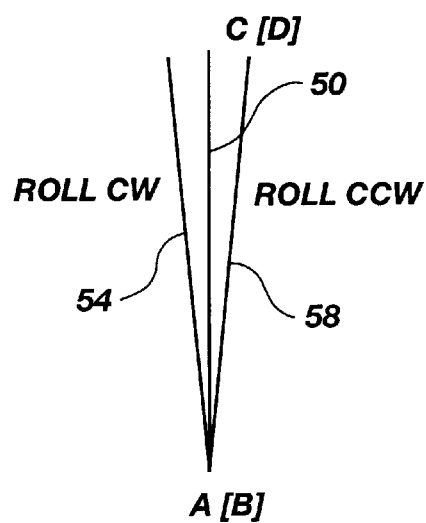
FIG. 5A depicts line of sight tilting paths for level and non-level cameras and indicates corrective actions to be taken to properly fine tune level a camera when tilting follows the non-vertical lines.

Referring to FIG. 5A, lines are shown that correspond to the line followed in the camera viewfinder as the camera is moved vertically up or down. Line 50 represents the vertical line between the preestablished reference points A and C or B and D. Lines 54 and 58 represent lines that the camera viewfinder may follow if the camera is not perfectly level on head 12. FIG. 5A represents possible lines that may be followed in the leveling procedure of the present invention.

The first step in fine tune leveling is to aim the camera at reference point A. Lock the camera pan and then tilt the camera upwardly to reference point C noting which direction the cross hairs wander from the vertical line AC. If the camera wanders from the vertical on either line 54 or 58, then adjust the camera tripod or pedestal 14 to roll in either a clockwise (CW) or counter clockwise (CCW) direction to compensate for the wandering off of the vertical. Repeat this procedure until tilting closely follows the vertical line 50. FIG. 5A indicates which direction to roll the camera 10 if the camera wanders from the desired vertical line 50.

Next, unlock the pan and aim the camera 10 at reference point B. Then lock the pan and tilt the camera 10 to reference point D noting which direction the cross hairs wander from the vertical line 50. Adjust the tripod or pedestal to roll CW or CCW to compensate for the wandering from the vertical line 50 and repeat the procedure until tilting closely follows the vertical line 50. At this point, repeat the above procedures in regard to the vertical line between AC and then BD until leveling is satisfactory, i.e., until the tilting precisely follows the vertical line AC as well as the vertical line BD.

Once the camera 10 is level, an accurate measurement of absolute tilt is necessary for triangulation and for proper composite registration during real-time camera tracking. Accurate measurement of relative tilt angle is guaranteed by the use of optical encoders in the head 12. However, the absolute tilt angle is established by keeping the head level and by knowing what tilt encoder reading equates to zero degrees of the optical axis, or "tilt offset". Although the tilt offset is primarily a characteristic of encoder mounting in the head, the camera's optical axis may not be exactly parallel to its mounting surface, but tilt offset will compensate for both factors.

Figure 6:
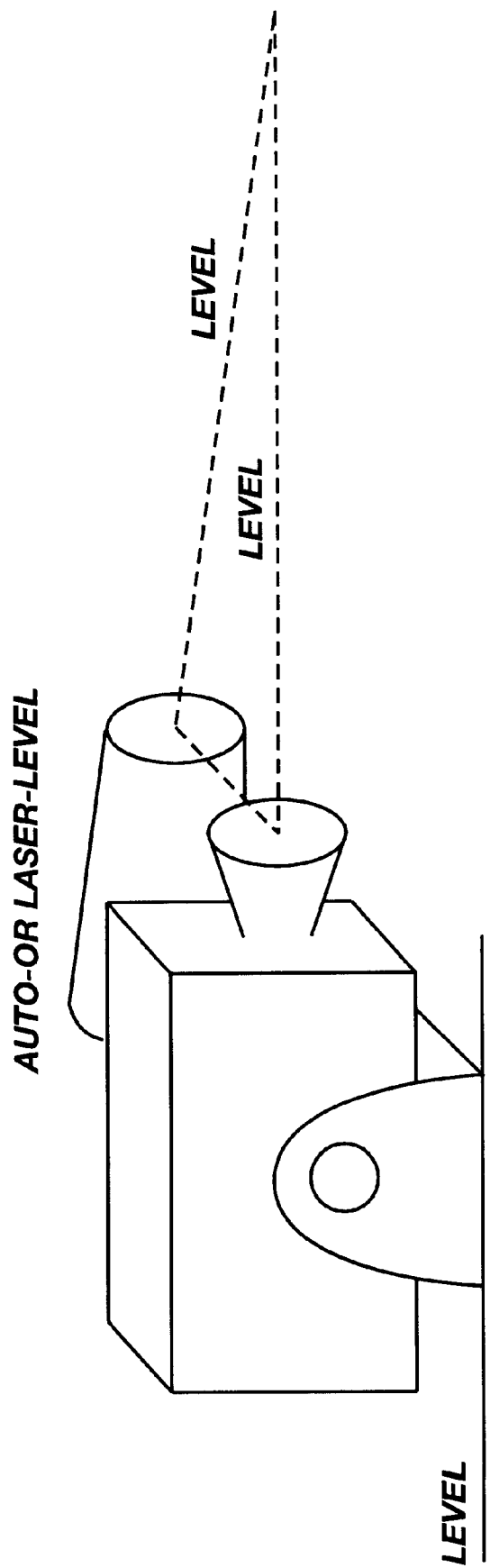
FIG. 6 shows a perspective side view of an apparatus for measuring tilt offset.

To determine tilt offset, FIG. 6 may be referred to while the following procedure is performed. (1) Using the procedure described above, level the camera head as accurately as possible. The camera viewfinder has cross hairs displayed therein so that the camera line of sight can be set to level gaze as accurately as you can guess. (2) Set a laser level (or auto level) adjacent to the camera on its own tripod. (3) Adjust the height of the laser level exit point (or auto level lens center) to the same height as the center of the camera lens. If an auto level is used, mark a spot on the wall at the level point. (4) Tilt the camera until the laser spot (or auto level mark) falls in the center of the cross hairs. Repeat steps (3) and (4) until the height of the laser level is within approximately 1/16" of the center of the camera lens. And finally, record the tilt offset, which is the tilt encoder reading, for future use.

Like the tilt angle, accurate measurement of absolute pan angle is necessary during real-time camera tracking for proper composite registration. Accurate measurement of relative pan angle is guaranteed by the use of optical encoders, but the absolute angle is established by knowing what pan encoder reading results when the optical axis points in the direction of zero degrees, or "pan offset". The pan offset changes with the alignment of the encoder on its shaft and with the rotation of pedestal 14 when it is moved across the studio floor. As described below, the pan offset is measured automatically during the triangulation process and no additional user intervention is required.

To sense the pan, tilt, zoom, and focus settings of the camera 10, incremental optical encoders are typically employed because they tend to have higher resolution and lower cost than absolute encoders. Accumulators in the encoder interface count the pulses from the encoder, both in positive and negative directions. The information in these accumulators is used to ascertain encoder position.

After power is applied, accumulators contain values unrelated to absolute encoder position. They need to be zeroed, or preset to some known value at a known position. Most incremental optical encoders are equipped with an index pulse for this purpose. To zero the incremental encoder, (1) set pan, tilt, zoom, and focus to extreme positions, and (2) exercise pan, tilt, zoom, and focus through their entire ranges to insure their index marks are encountered at some point.

After establishing reference points and properly positioning the camera 10, a processor 70 (shown in a schematic diagram in FIG. 7) is used for entering and processing all data relating to establishing the viewport definition. Encoder data is entered electronically. All other data can be entered into the processor 70 through a user interface 72 or a button panel 74. The user interface 72 can be a keyboard, a mouse, a touchscreen, or other custom user interface for entering data into the processor 70. The processor 70 receives the data relating to (i) the reference points (i.e., h, the distance between points A and C; w, the distance between points A and B), (ii) the leveling information (tilt offset), (iii) lens characterization, (iv) studio space offset and orientation, (v) TRy and TRz, (vi) encoder specifications; and (vii) model space scale. The processor 70 is programmed to process the above position data combined with sensor data from the pan, tilt, zoom, and focus sensors of the camera such that a camera viewport (or nodal point) is defined by the processor.

Calculating the nodal point E (eyepoint) as the camera 10 moves is the ultimate goal of the camera tracking device. One component of this calculation is the location of the pan/tilt intersection point T in model space, which must be reestablished whenever the pedestal 14 is moved. The vector from the studio reference point A to the pan/tilt intersection point T in studio space coordinates is called vector sAT. Vector sAT is established through a process of triangulation. The vector from the model space origin to the studio reference point A in model space coordinates is called mMA and is entered into the processor 70 through the "Controller Properties Dialog" appearing on display 78. The sum of these vectors is the mMT vector, or simply, model space vector T.

The "Pedestal Positioning Dialog" appearing on display 78 allows you to enter mAT directly, or to enter triangulation angles from which mAT is calculated. Automatically calculating the camera position is accomplished using a four-point "point-and-shoot" method. This method is independant of camera height, independent of position of eyepoint along optical axis, and captures triangulation information so that the camera position can be determined with selective use of button panel 74 on the processor 70. Also, cameras whose nodal point is offset from the pan/tilt axis intersection T are accomodated in the method. The method is used after the camera 10 is placed in the desired position for the next shot. The first step is to zoom the camera in to maximum magnification and to adjust the focus as necessary. Next, the camera head should be leveled. At this point, the four-point "point-and-shoot" method is begun:

(1) pan and tilt the camera such that the cross hairs fall onto point A and press the LL (lower left) button on the button panel 74 to record the pan and tilt angles of point A;

(2) tilt the camera onto point C and press the UL (upper left) button on the button panel 74 to record the pan and tilt angles of point C;

(3) pan and tilt the camera onto point D and press the UR (upper right) button on the button panel 74 to record the pan and tilt angles of point D; and (4) tilt the camera onto point B and press the LR (lower right) button on the button panel 74 to record the pan and tilt angles of point D.

This four-point "point-and-shoot" method captures all of the data necessary to triangulate the camera's position relative to the studio coordinate system. The processor 70 performs the triangulation calculations and determines the camera position. Using the camera position data, the processor 70 is then able to calculate a new viewport definition based on the camera position each time a change occurs in the data relating to the sensor information of the camera's pan, tilt, zoom, and focus. In other words, once T, TR, r, $\delta$, pan, tilt, zoom and focus are known, E can be calculated dynamically within processor 70 based on the variables pan, tilt, zoom, and focus. The non-offset nodal point case, as in the theodolite, is a degenerate case for this procedure, where r is zero and $\delta$ is not applicable. The details of these calculations are described below.

As described above, some of the camera parameters are manually measured and entered into the processor 70 through the user interface 72, however, the processor 70 must be programmed to manipulate the input data in the desired manner. In addition, many of the camera parameters can be calculated without manual measurements and the parameters are calculated through the various equations that are programmed in the processor 70 and that are shown in the following paragraphs:

Dynamic Nodal Point (E) Calculations

For calculation of model space vector to eyepoint, Equation 1 can be used:

$$mME=mMA+\{sAT+(eTR+eRE)[et][tp][pm]\}[sm] \qquad \text{EQ.1:}$$

where m is model space s is studio space e is eye space (parallel to tilt space but offset)

mMA is the model space offset of A appropriate for the desired database view sAT is measured in the camera "point and shoot" positioning procedure eTR is measured after the camera is mounted on the head eRE is from the lookup table determined in the lens calibration procedure (see simultaneously filed application entitled METHOD FOR MEASURING CAMERA AND LENS PROPERTIES FOR CAMERA TRACKING filed Apr. 4, 1997, now pending, which is hereinafter incorporated by reference)

[et]=1

[tp]=tilt rotation

[ps]=pan rotation

[sm]=studio to model space transformation

Calculating Distance d—The Simple Case

Figure 8:
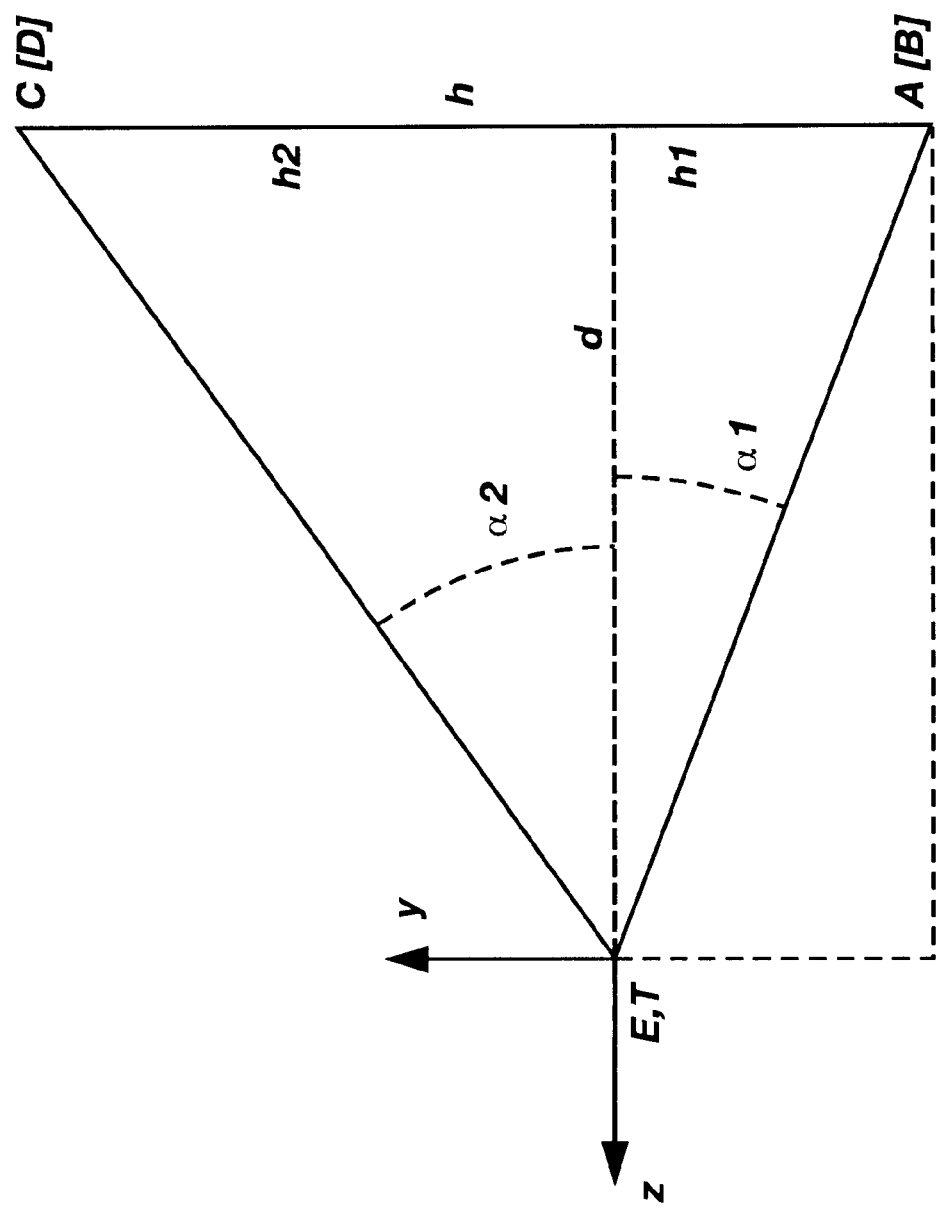
FIG. 8 shows a side view of the angles used in the computation of distance d.

The processor 70 can be used to calculate distance d from the eyepoint at an arbitrary height to a vertical reference line given height h and tilt angles $\alpha 1$ and $\alpha 2$ measured from level (see FIG. 8). Camera height relative to point A can also be calculated. Model space Ey is Ay plus h1. If A is level with E, h1 goes to zero. The head must be leveled before angle measurements are taken. This method of computation assumes that the eyepoint E is at the pan/tilt axis intersection as is the case for the theodolite. Using Equation 2, distance d can be calculated:

$$d=h/(\tan(\alpha 2)-\tan(\alpha 1)) \qquad \text{EQ. 2:}$$

where h=h2−h1 h1=dtan($\alpha 1$) $\alpha 1$ is a negative angle in this example, so h1 is negative h2=dtan($\alpha 2$) $\alpha 2$ is a positive angle in this example Calculating Distance d With Offset Eyepoint For offset eyepoint, the eyepoint is displaced from the pan/tilt intersection. An offset eyepoint is normal for a camera and distance d is calculated using Equation 3 with the variables being shown in FIG. 4A. The eyepoint lies somewhere along the optical axis. Its exact position is not a factor. Note in this example that $\alpha 1$ is a negative angle yet the slope of its line is positive, and that $\alpha 2$ is a positive angle yet the slope of its line is negative. This is because the direction of positive tilt angle is opposite that of textbook conventions. Note also that although TR has positive y and negative z, it is still a positive angle. Camera height Ty relative to A is also computed.

$$d=(TRy(1/\cos\alpha 1-1/\cos\alpha 2)+h)/(\tan\alpha 2-\tan\alpha 1) \qquad \text{EQ. 3:}$$

Calculating Width w

Figure 9:
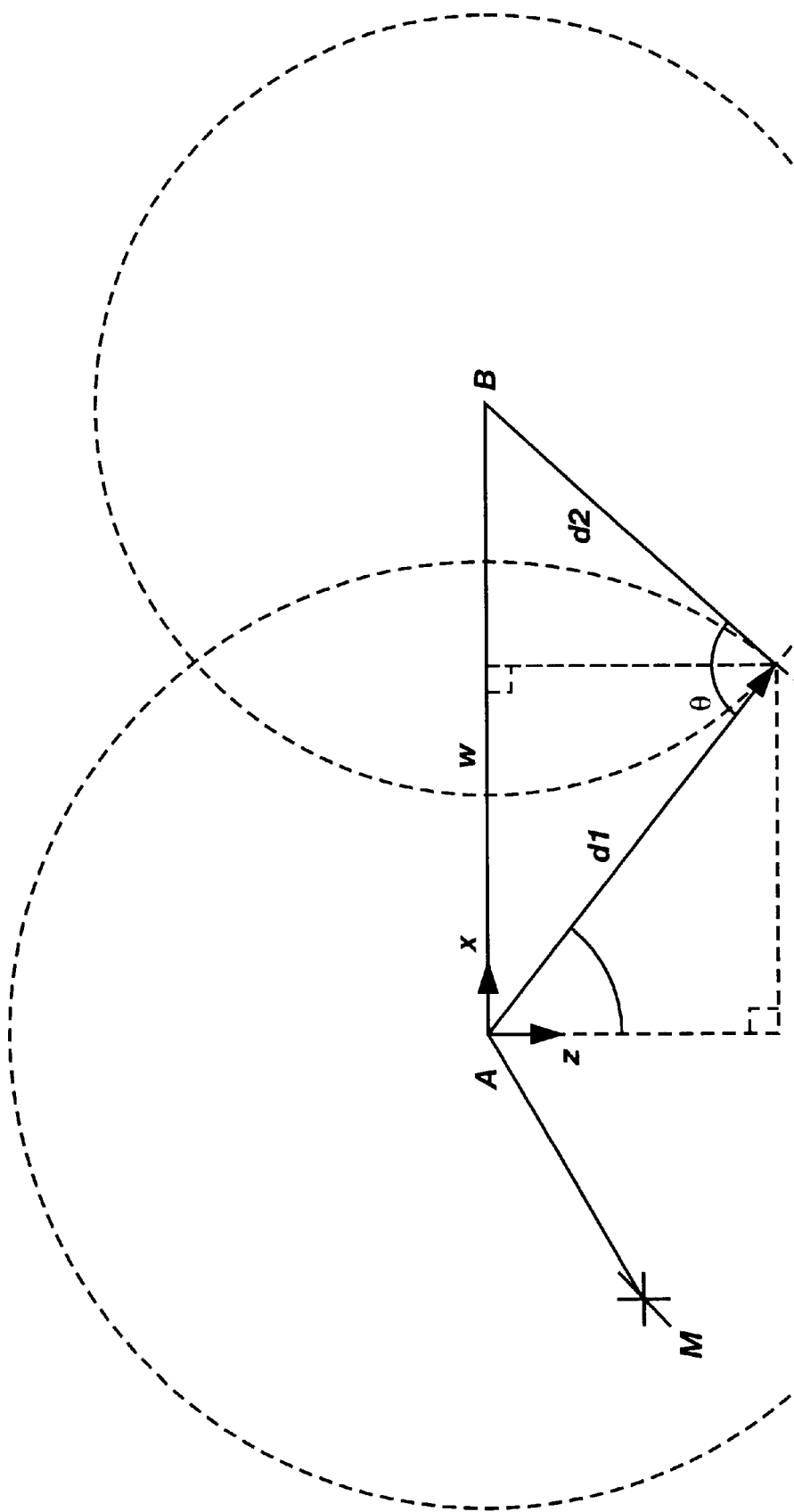
FIG. 9 shows a top view of intersecting circles that are used to compute the location of the pan/tilt intersection T.

Although you can manually measure width w, you can also calculate width w with processor 70 using the studio reference points from the setup procedure. As shown in FIG. 9, distances d1 and d2 (from the eyepoint to the left and right studio reference lines, respectively), and pan angle $\theta$ are used to calculate width w using the law of cosines:

$$w=\text{sqrt}(d1*d1+d2*d2-2*d1*d2*\cos(\theta)) \qquad \text{EQ. 4:}$$

Triangulation Calculations

Vector sAT is the pan/tilt intersection T relative to A in studio space. It is automatically calculated in processor 70 using width w and the distances d1 and d2 calculated with methods described above. The eyepoint lies at the intersection of the two circles (cylinders at the height Ty calculated above) centered at vertical lines A and B and whose radii are d1 and d2, respectively. See FIG. 9. With the circle equations described below, Equations 5 and 6 are derived for use in the final triangulation calculations.

Circle 1: $x^2+z^2=d1^2$ or $z^2-d1^2=x^2$

Circle 2: $(x-w)^2+z^2=d2^2$ $$x=(d1^2-d2^2+w^2)/2w \qquad \text{EQ. 5:}$$

$$z=\text{sqrt}(d1^2-x^2) \qquad \text{EQ. 6:}$$

There are two solutions to these equations since the circles intersect at two points. The correct solution can be determined from the pan angle measurement. If the pan angle is positive when panning from A to B, the eyepoint is in positive z, and negative otherwise.

These calculations lose resolution in z as the eyepoint approaches the ABCD plane. The circles approach tangency and might not even overlap because of slight errors in angular measurements. You may reposition the reference points to regain accuracy if this becomes a problem.

Pan Offset Calculations

The pan offset is the pan value when the camera is aimed exactly in parallel with the −z axis. As described earlier, pan offset is automatically computed as a byproduct of the triangulation operations above.

$$\text{pan offset} = \text{pan angle at left} + \text{atan}(ATx/ATz) \quad \text{EQ. 7:}$$

As stated, the above equations are representative of the preferred embodiment of the present invention and other equations could be used when programming the processor 70 to accomplish the steps of the present invention. In addition, other embodiments may be used to accomplish other steps in the present invention.

In an alternative embodiment, another method to establish reference points A, B, C, and D can be used. Although the method again requires that you obtain a plumb bob, a ladder, a measuring tape, and markers (e.g., thumbtacks), the method also requires an accurately leveled camera or, for better accuracy and ease of use, a theodolite. Advantageously, this method will only take approximately 30 minutes to complete.

Figure 7:
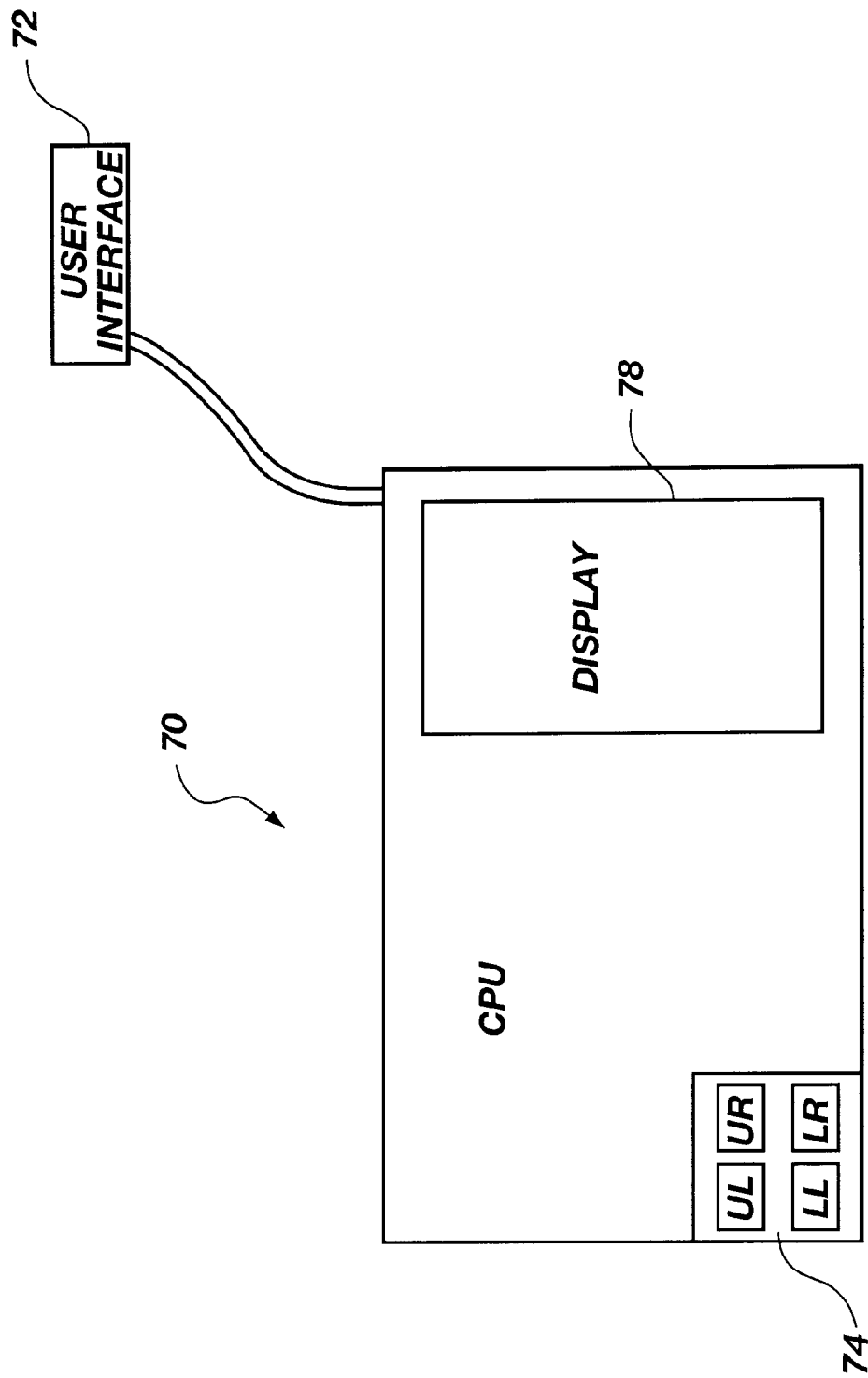
FIG. 7 shows a schematic diagram of a processor for use in tabulating and processing pan, tilt, zoom, and focus encoder data as well as other data relating to the reference points.

First, the processor 70 of FIG. 7 should be programmed to have a camera tracker properties dialog displayed on display 78. This dialog will assist in the calculation and entry of studio reference point parameters h and w into the processor 70. Next, plan approximate locations of reference points. With the plumb bob, drop a vertical line that will lie along AC at a convenient place at the left of the studio. Drop the line at a place that can be seen by the camera for all anticipated camera positions. A wall is often a good choice, with an almost vertical surface and a place to put a mark without requiring additional supporting structures. Then, set up the camera at some central point on the studio floor such that it can see all four planned reference point locations. Camera height is not critical, but the camera should be level. Set and lock tilt at zero degrees.

The next step is to pan to the vertical line AC and temporarily mark the level position, point L. Drop down a distance from L and mark point A. Use a mark large enough to be seen by the camera, but small enough to encourage precision. Note distance AL. An alternate method is to note the pan angle reading as theta initial ($\theta$ i) in the processor 70 by pressing LL or UL on the button panel 74. When using a theodolite, you may manually enter theta initial in the field provided.

Using a tape measure, go up a distance h (preferrably 304.8 centimeters or more) from point A along the vertical and mark point C. A shim can be used at either A or C to place these points on the exact vertical line. This may be necessary if the wall is not plumb. Record distance h in the processor display 78 dialog. Next, with the plumb bob, drop a vertical line that will become BD at a convenient place at the right of the studio. Pan from point A to the new vertical line and temporarily mark R which is level with L. Drop down AL and mark point B. B will be at the same horizontal level as A since the camera is panning in a level plane from L to R. Alternatively, note the new pan angle reading as theta final ($\theta$ f) in the processor 70 by pressing LR or UR on the button panel 74. When using a theodolite, you may manually enter theta final in the field provided. Angle theta ($\theta$) is automatically calculated in the processor 70 as theta final minus theta initial. When using a theodolite, you can directly enter the pan angle difference between L and R as angle $\theta$ in the processor 70 in the field provided.

Next, using a tape measure, go up distance h from point B along the vertical and mark point D. With a tape measure, determine the horizontal distance w, or width, between the two verticals. Measure between L and R. Enter width w in the dialog displayed on the display 78 of the processor 70. At this point, the marking of the studio reference points A, B, C, and D is now completed. The values of dimensions h and w have also been measured and entered into the processor 70.

Figure 10:
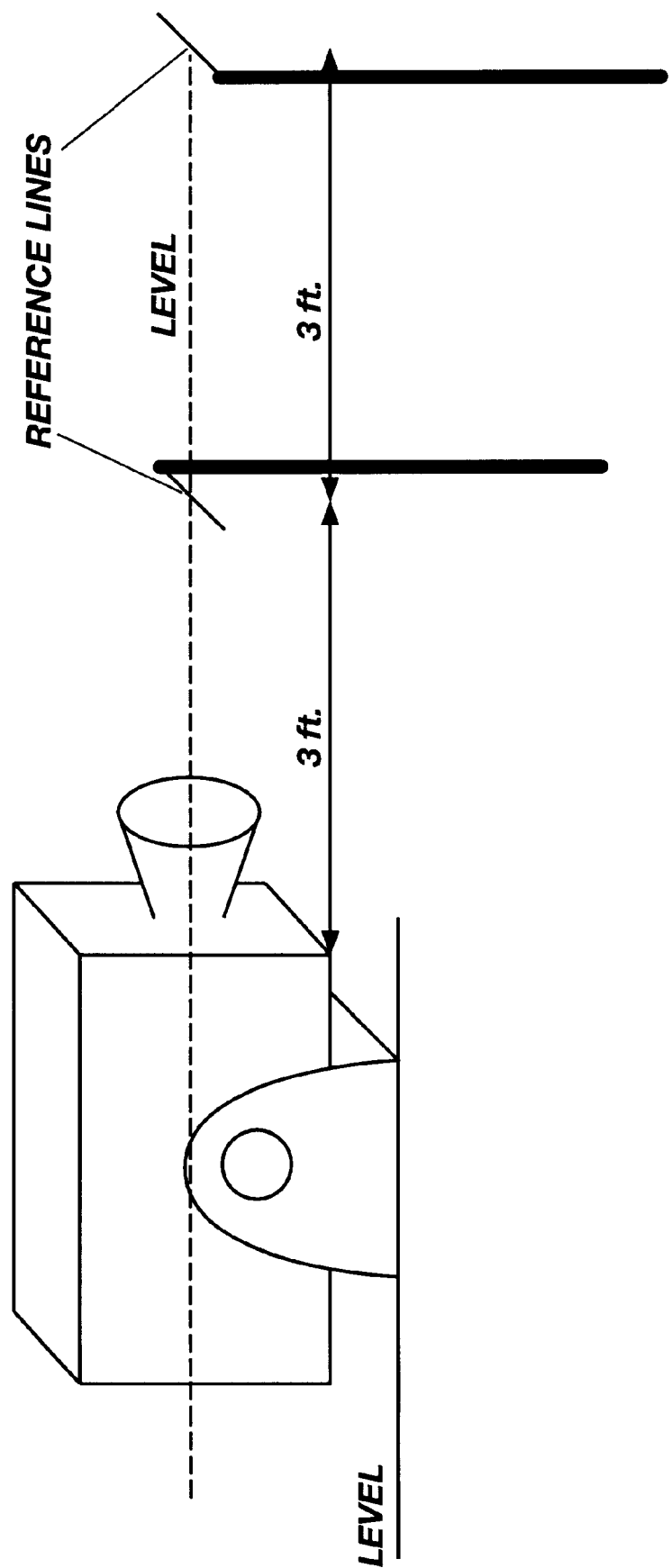
FIG. 10 shows a perspective side view of a second apparatus for measuring tilt offset.

FIG. 10 shows another embodiment for the method of measuring tilt offset. This method begins with leveling the head as accurately as possible. Next, set tilt to zero (level) as accurately as you can guess. The Evans and Sutherland head has a leveling bubble on the mounting plate for this purpose. Then, raise the height of the camera so the center of the lens is in line with the two leveled reference lines. Next, tilt the camera until the two reference lines meet in the center of the image at the cross hairs, and finally, press "Capture Tilt Offset" on the display 78 of the processor 70. Of course it is to be understood that data can be entered into the processor 70 by pressing prompts on the display 78 or an arrangment can be used that provides a user interface 72 such as a mouse or other interactive connection to the display.

Figure 11:
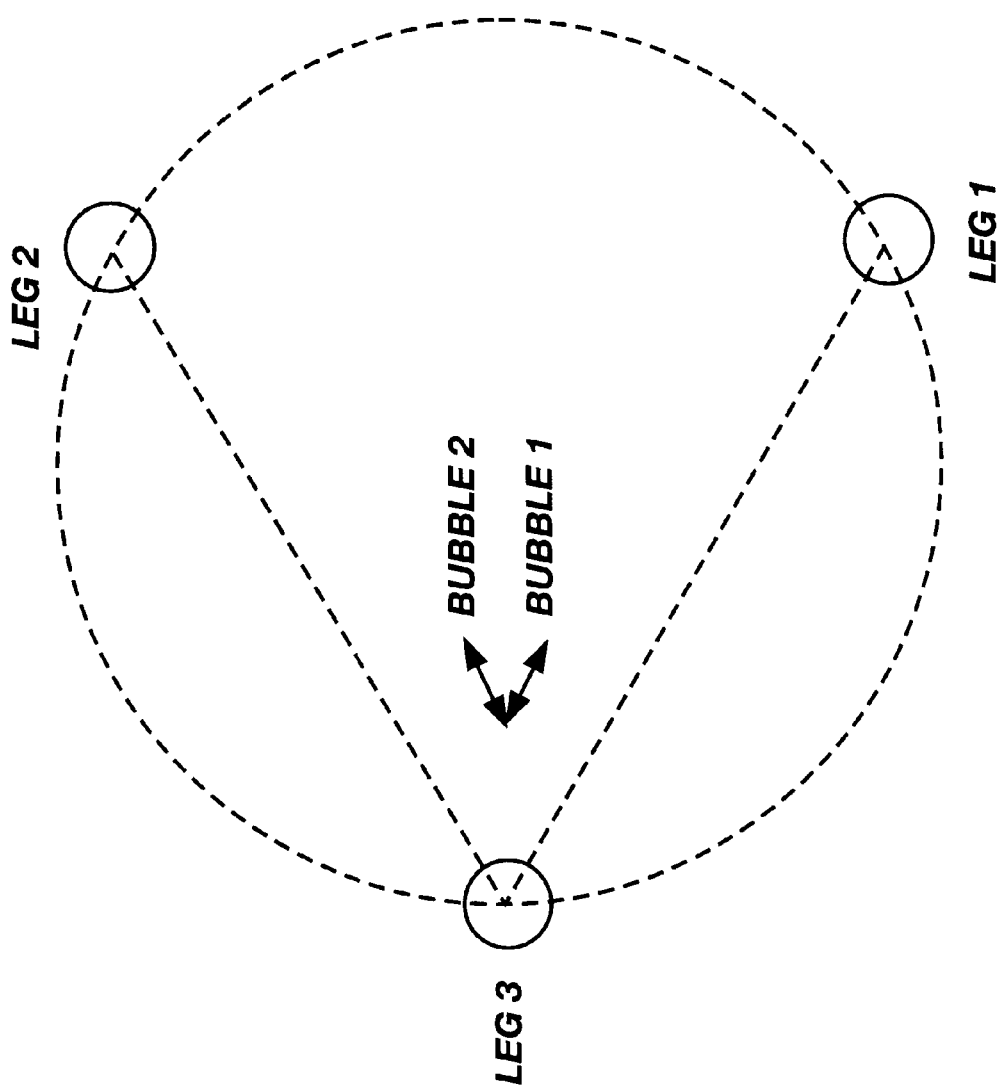
FIG. 11 shows a top view of a tripod head equipped with tubular bubbles at 60 degrees.
Figure 12:
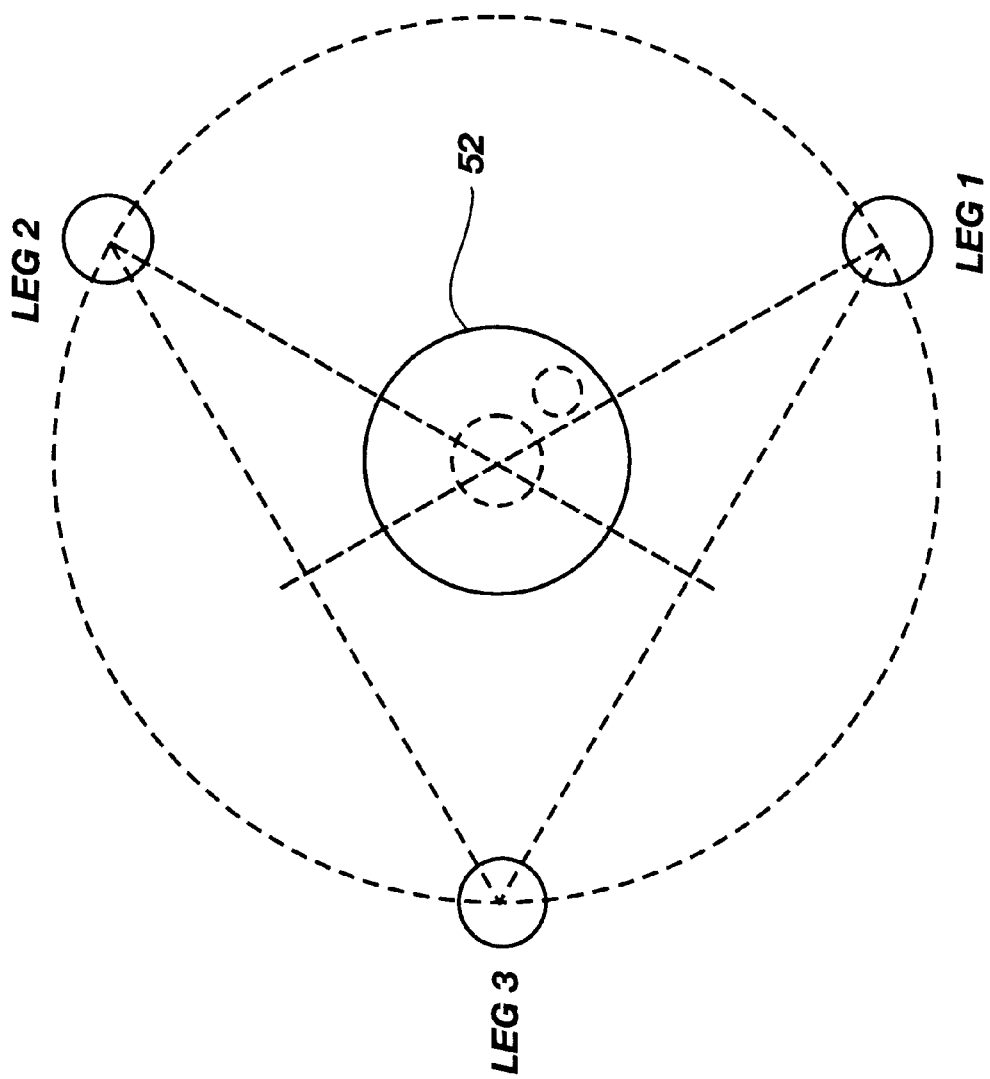
FIG. 12 shows a top view of a tripod head equipped with a circular (or bullseye) level.

Other embodiments for leveling the head are shown in FIGS. 11 and 12. FIG. 11 shows a top view of a head equipped with tubular bubble levels in a sixty degree "V". The head is oriented on the tripod so that the axis of Bubble 1 is approximately parallel to an imaginary line through Leg 1 and Leg 3 pivots, and the axis of Bubble 2 is parallel to an imaginary line through Leg 2 and Leg 3 pivots. To level the head using the FIG. 11 arrangement, (1) adjust Leg 1 until Bubble 1 is centered (note that Bubble 2 is relatively insensitive to changes in Leg 1); (2) adjust Leg 2 until Bubble 2 is centered (note that Bubble 1 is relatively insensitive to changes in Leg 2); and (3) repeat step 1 and 2 if necessary until the desired leveling is accomplished.

FIG. 12 shows a top view of a head equipped with a bullseye circular bubble level 52. The head is oriented on the tripod so that the dashed lines through the circular level 52 device represent the direction of the path the bubble takes as Leg 1 or Leg 2 are adjusted. To level the head using the FIG. 12 arrangement, (1) adjust Leg 1 until bubble 52 is somewhere along the dashed path shown for Leg 2; (2) adjust Leg 2 until bubble 52 is centered; and (3) repeat step 1 and 2 if necessary until the desired leveling is accomplished.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed and desired to be secured by United States Letters Patent is:

1. A method for generating a viewport for a computer generated image using sensor information relating to settings of a video camera's pan, tilt, zoom, and focus, the method comprising the steps of:
   (a) establishing reference points within an enclosed space which is to be used for recording images with the camera;

(b) positioning the camera within the enclosed space relative to the reference points such that the camera position can be determined through triangulation with respect to the reference points;

(c) developing position data through triangulation which identifies the camera position in a coordinate system relative to the reference points;

(d) recording camera orientation data from sensors disposed to detect camera parameters that define the camera's pan, tilt, zoom, and focus settings; and (e) developing a database defining a viewport for the camera, the database defined from a combination of the position data and the camera orientation data.

2. The method of claim 1 wherein step (a) comprises positioning at least four points viewable by the camera in a planar configuration within the enclosed space.

3. The method of claim 1 wherein step (b) comprises successively positioning the camera within the enclosed space relative to the reference points.

4. The method of claim 1 wherein step (b) comprises positioning the camera on a support such that the reference points are within the view of the camera.

5. The method of claim 4 wherein the support is selected from the group consisting of a tripod and a pedestal.

6. The method of claim 1 wherein step (b) comprises laterally centering the camera on a support.

7. The method of claim 1 wherein step (b) comprises leveling the camera on a head of a support.

8. The method of claim 7 wherein leveling the camera comprises visually ascertaining levelness of the camera and then manually leveling the head on the support to thereby level the camera.

9. The method of claim 1 wherein step (b) comprises developing position data which indicates a tilt offset of the camera.

10. The method of claim 1 wherein step (b) comprises developing position data which indicates an absolute pan angle of the camera.

11. The method of claim 1 wherein step (c) comprises entering the position data into a processor programmed to generate the database defining a viewport for the camera, the position data including a tilt offset, a model space scale, an absolute pan angle, a horizontal distance between reference points, a vertical distance between reference points, a lens characterization, a studio offset and orientation, encoder specifications, and camera angles relative to the reference points.

12. The method of claim 11 wherein the coordinate system is selected from the group consisting of a rectangular coordinate system, a cylindrical coordinate system, a spherical coordinate system, and a polar coordinate system.

13. The method of claim 11 wherein entering the position data includes successively pointing the camera to each of the reference points and signaling the processor to indicate to the processor that the camera is pointing at one of the reference points.

14. The method of claim 1 wherein step (c) comprises processing with a processor the position data of the camera such that, relative to the coordinate system, the camera position is determined relative to the reference points.

15. The method of claim 1 wherein step (d) comprises dynamically tabulating in a processor the camera orientation data from the sensors disposed to detect camera parameters that define the camera's pan, tilt, zoom, and focus settings.

16. The method of claim 1 wherein step (e) comprises processing with a processor the position data and the camera orientation data such that for each setting adjustment in pan, tilt, zoom, and focus, the viewport definition for the camera is dynamically determined in the coordinate system relative to the reference points.

17. Apparatus for generating a viewport for a computer generated image using sensor information relating to settings of a video camera's pan, tilt, zoom, and focus, the apparatus comprising:

at least four reference points within an enclosed space which is to be used for recording images with the camera;

a means for positioning the camera within the enclosed space relative to the at least four reference points such that the camera position can be determined through triangulation with the at least four reference points;

a means for developing position data through triangulation which identifies the camera position in a coordinate system relative to the at least four reference points;

a means for recording camera orientation data from at least one sensor disposed to detect camera parameters that define the camera's pan, tilt, zoom, and focus settings; and a means for developing a database defining a viewport for the camera, the database defined from a combination of the position data and the camera orientation data.

18. Apparatus as in claim 17 wherein the at least four points are viewable by the camera and are disposed in a planar configuration within the enclosed space.

19. Apparatus as in claim 17 wherein the means for positioning the camera is a support positioned such that the reference points are within the view of the camera.

20. Apparatus as in claim 19 wherein the support is selected from the group consisting of a tripod and a pedestal.

21. Apparatus as in claim 17 wherein the camera is laterally centered on a support.

22. Apparatus as in claim 17 wherein the camera is level on a head of a support.

23. Apparatus as in claim 17 wherein the means for developing position data comprises a processor programmed to calculate and store data which indicates a tilt offset of the camera.

24. Apparatus as in claim 17 wherein the means for developing position data comprises a processor programmed to calculate and store data which indicates an absolute pan angle of the camera.

25. Apparatus as in claim 17 wherein the means for developing position data comprises a processor having means for entering data into the processor, the processor being programmed to generate position data which identifies the camera position in a coordinate system relative to the at least four reference points.

26. Apparatus as in claim 25 wherein the coordinate system is selected from the group consisting of a rectangular coordinate system, a cylindrical coordinate system, a spherical coordinate system, and a polar coordinate system.

27. Apparatus as in claim 17 wherein the means for recording camera orientation data from at least one sensor comprises a processor having means for entering the camera orientation data into the processor.

28. Apparatus as in claim 17 wherein the means for developing a database defining a viewport for the camera comprises a processor programmed to develop said database, the database defined from a combination of the position data and the camera orientation data.

29. A method for defining a viewport for a computer generated image using information relating to settings of a camera's pan, tilt, zoom, and focus, the method comprising the steps of:
 (a) establishing reference points in an enclosed space which is to be used for recording images with the camera;
 (b) determining the camera position and orientation from a support means in the enclosed space through triangulation in the enclosed space;
 (c) measuring a viewport for the camera as a function of zoom and focus settings on the camera;
 (d) measuring offsets of the camera that are involved in mounting the camera to the support means;
 (e) scaling virtual space relative to space in the enclosed space; and
 (f) offsetting virtual space relative to the camera offsets in the enclosed space to thereby generate a viewport for the computer generated image.

30. The method of claim 29 wherein step (b) comprises entering data into a processor when the camera is pointed to each of the reference points in the enclosed space, the processor being programmed to calculate the camera position through triangulation.

31. The method of claim 29 wherein steps (c) through (f) further comprise entering the viewport for the camera into a processor and entering the offsets of the camera into the processor, the processor being programmed to scale virtual space and offset virtual space to thereby generate the viewport for the computer generated image.

* * * * *